United States Patent
Cunningham

(10) Patent No.: US 9,637,181 B1
(45) Date of Patent: May 2, 2017

(54) BUMPER SEAL MEMBERS AND VEHICLES INCLUDING THE SAME

(71) Applicant: Toyota Motor Engineering & Manufacturing North America, Inc., Erlanger, KY (US)

(72) Inventor: James D. Cunningham, Clarkston, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 15/203,201

(22) Filed: Jul. 6, 2016

(51) Int. Cl.
*B62D 35/00* (2006.01)

(52) U.S. Cl.
CPC .................... *B62D 35/00* (2013.01)

(58) Field of Classification Search
CPC ...................................... B62D 35/00
USPC .................. 296/180.1, 193.09; 293/102, 155
See application file for complete search history.

(56) References Cited

U.S. PATENT DOCUMENTS

| | | | |
|---|---|---|---|
| 4,761,917 A | 8/1988 | Knecht et al. | |
| 4,950,031 A * | 8/1990 | Mizunaga | B62D 25/2027 293/155 |
| 5,345,719 A | 9/1994 | Karwande | |
| 6,298,906 B1 | 10/2001 | Vize | |
| 7,900,982 B2 | 3/2011 | Moore | |
| 8,366,168 B1 | 2/2013 | Ksiezopolski et al. | |

FOREIGN PATENT DOCUMENTS

| | | |
|---|---|---|
| EP | 0397300 A2 | 11/1990 |
| JP | 05238337 A | 9/1993 |

\* cited by examiner

*Primary Examiner* — Joseph D Pape
(74) *Attorney, Agent, or Firm* — Dinsmore & Shohl LLP

(57) ABSTRACT

A vehicle front fascia includes a vehicle panel, a bumper assembly positioned below the vehicle panel in a vehicle vertical direction, and a seal member coupled to the vehicle panel and extending between the vehicle panel and the bumper assembly in the vehicle vertical direction. The seal member includes a seal portion that extends downward from the vehicle panel in the vehicle vertical direction, and a bulb portion spaced apart from the seal portion in a vehicle longitudinal direction, the bulb portion comprising a bulb wall that defines a cavity within the bulb wall.

20 Claims, 4 Drawing Sheets

BUMPER SEAL MEMBERS AND VEHICLES INCLUDING THE SAME

TECHNICAL FIELD

The present specification relates to bumper seal members, and in particular to seal members positioned between a vehicle panel and a bumper assembly. Vehicles including bumper seal members are also described.

BACKGROUND

Vehicles may include panels that are coupled to one another to form the body of the vehicle. Some vehicles, such as vehicles including body-on-frame construction, may include a vehicle body that is coupled to a vehicle frame. During normal driving conditions, as air flows over the vehicle, air can flow into the gaps between adjacent body panels and/or between the vehicle body and the vehicle frame. The air flow into the gaps may form high pressure zones at the gaps, increasing aerodynamic drag on the vehicle and decreasing the overall vehicle efficiency.

Accordingly, a need exists for seal members that reduce air flow into the gaps positioned between adjacent body panels and/or gaps between the vehicle body and the vehicle frame.

SUMMARY

In one embodiment, a vehicle front fascia includes a vehicle panel, a bumper assembly positioned below the vehicle panel in a vehicle vertical direction, and a seal member coupled to the vehicle panel and extending between the vehicle panel and the bumper assembly in the vehicle vertical direction. The seal member includes a seal portion that extends downward from the vehicle panel in the vehicle vertical direction, and a bulb portion spaced apart from the seal portion in a vehicle longitudinal direction, the bulb portion comprising a bulb wall that defines a cavity within the bulb wall.

In another embodiment, a vehicle includes a vehicle panel, a bumper assembly positioned below the vehicle panel in a vehicle vertical direction, and a seal member coupled to the vehicle panel and extending between the vehicle panel and the bumper assembly in the vehicle vertical direction. The vehicle panel and the bumper assembly define a gap positioned between the vehicle panel and the bumper assembly in the vehicle vertical direction. The vehicle panel and the bumper assembly are repositionable between a nominal position, in which the gap includes a nominal gap height evaluated between the vehicle panel and the bumper assembly in the vehicle vertical direction, and a dynamic position, in which the gap comprises a dynamic gap height evaluated between the vehicle panel and the bumper assembly in the vehicle vertical direction. The dynamic gap height is different from the nominal gap height. The seal member includes a seal portion that extends downward from the vehicle panel in the vehicle vertical direction, and a bulb portion spaced apart from the seal portion in a vehicle longitudinal direction. The bulb portion contacts the bumper assembly when the bumper assembly is in the nominal position and the bulb portion contacts the bumper assembly when the bumper assembly is in the dynamic position.

In yet another embodiment, a vehicle includes a vehicle panel, a bumper assembly positioned below the vehicle panel in a vehicle vertical direction, and a seal member coupled to the vehicle panel and extending between the vehicle panel and the bumper assembly in the vehicle vertical direction. The seal member includes a seal portion that extends downward from the vehicle panel in the vehicle vertical direction, and a bulb portion spaced apart from the seal portion in a vehicle longitudinal direction, wherein the bulb portion is compressible between a nominal position, in which the bulb portion has a nominal height evaluated in the vehicle vertical direction, and a compressed position, in which the bulb portion has a compressed height evaluated in the vehicle vertical direction, wherein the compressed height is less than the nominal height.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Vehicles including bumper seal members are disclosed herein. The bumper seal member may extend across a gap between a vehicle bumper and a vehicle panel. By extending across the gap, the bumper seal member may reduce airflow through the gap, which may reduce air drag on the vehicle, thereby increasing overall vehicle efficiency. These and other embodiments will be described in more detail below in reference to the appended drawings.

As used herein, the term "vehicle longitudinal direction" refers to the forward-rearward direction of the vehicle (i.e., in the +/−X-direction as depicted). The term "vehicle lateral direction" refers to the cross-wise direction of the vehicle (i.e., in the +/−Y-direction as depicted), and is transverse to the vehicle longitudinal direction. The term "vehicle vertical direction" refers to the upward-downward direction of the vehicle (i.e., in the +/−Z-direction as depicted).

Figure 1:
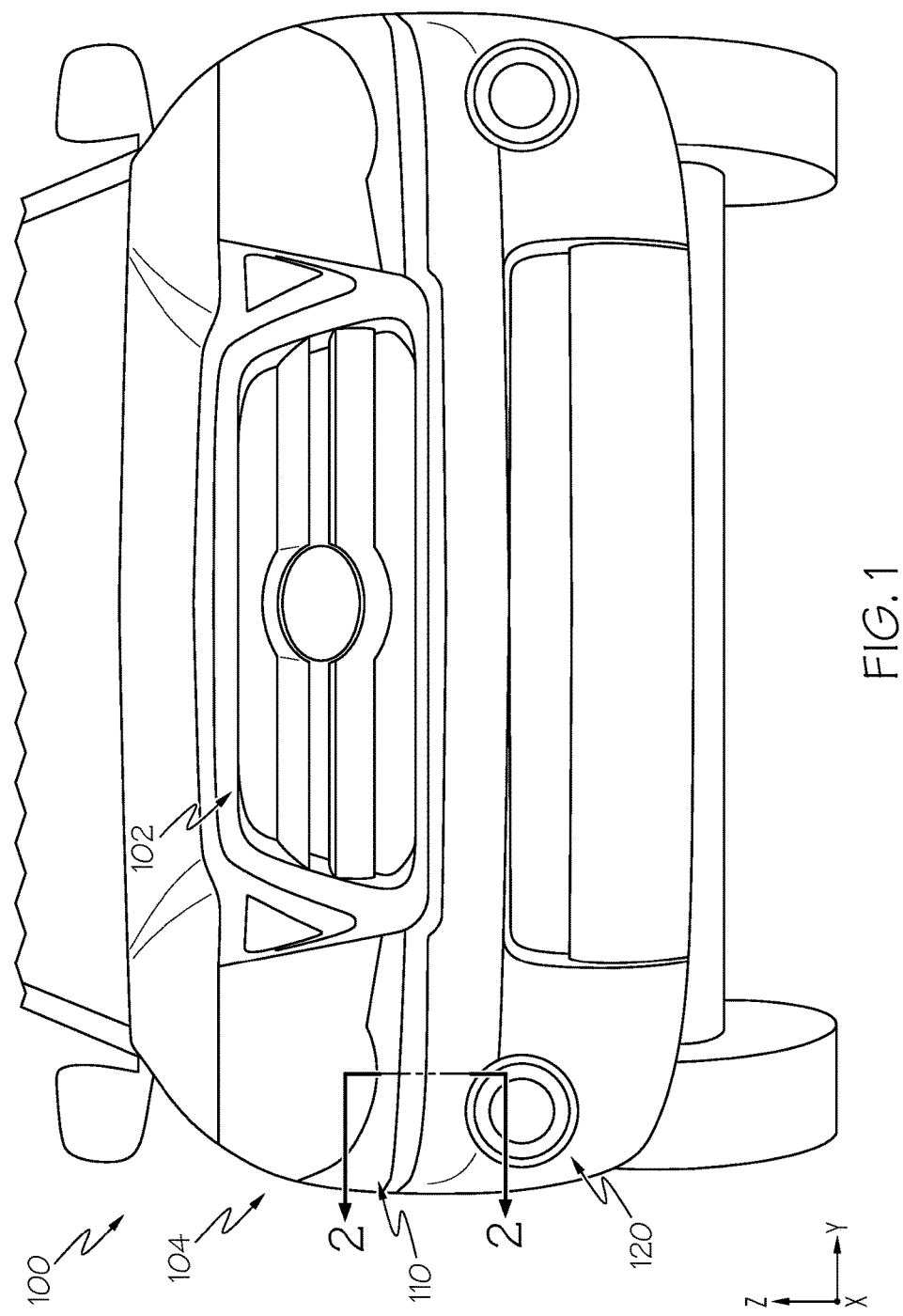
FIG. 1 schematically depicts a front fascia of a vehicle including a vehicle panel and a bumper assembly according to one or more embodiments shown and described herein.

Motor vehicles that incorporate elements according to the present disclosure may include a variety of construction methodologies that are conventionally known, including the body-on-frame construction methodology depicted in FIG. 1 as well as a unibody construction methodology. While embodiments of the present disclosure are described and depicted herein in reference to body-on-frame structures, it should be understood that vehicles that are constructed with unibody construction may incorporate the elements that are shown and described herein.

Referring initially to FIG. 1, a front view of a vehicle 100 is schematically depicted. The vehicle 100 includes a front fascia 104 positioned at the front of the vehicle 100, the front fascia 104 including a bumper 120, a vehicle panel 110, and a grille 102. The vehicle panel 110 is positioned above the bumper 120 in the vehicle vertical direction, and may include a body filler panel, a front fender, or the like positioned at the front of the vehicle 100.

Figure 2:
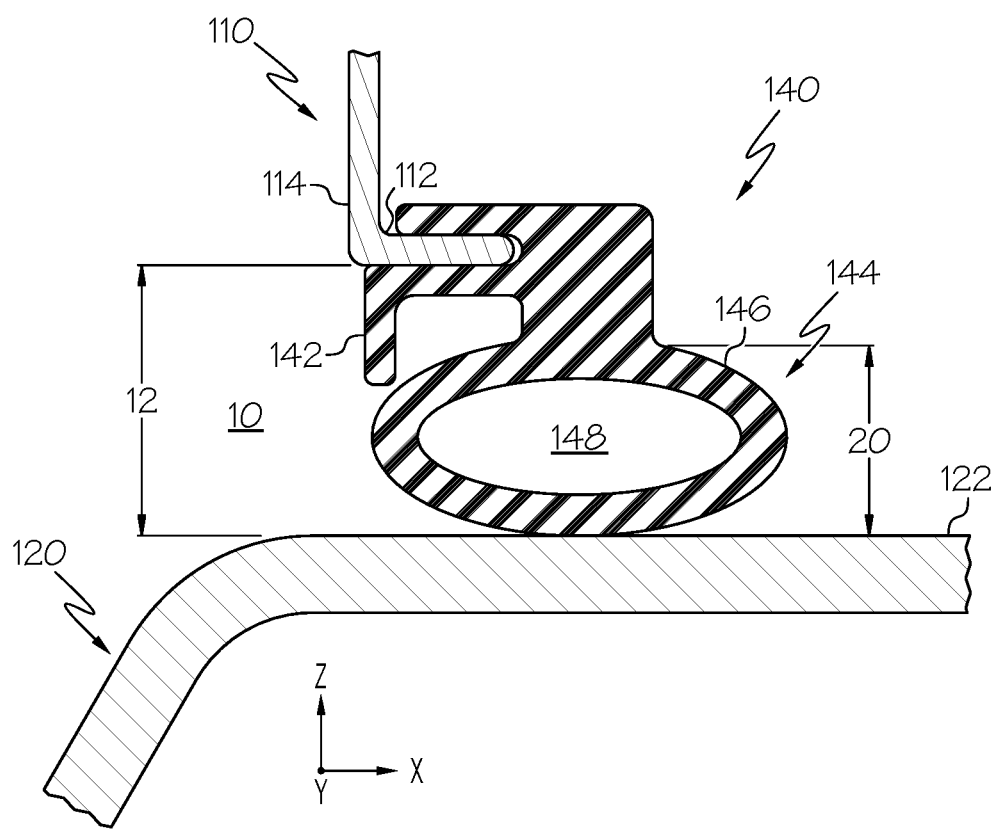
FIG. 2 schematically depicts a cross-section of the vehicle panel, the bumper assembly, and a seal member along section 2-2 of FIG. 1 according to one or more embodiments shown and described herein.

Referring to FIG. 2, a section view of the front fascia 104 along section 2-2 of FIG. 1 is schematically depicted. In embodiments, the vehicle panel 110 includes a forward-facing panel 114 that is oriented to face forward in the vehicle longitudinal direction. The vehicle panel 110 may also include a flange 112 that extends rearward from the forward-facing panel 114. In embodiments, the flange 112 is oriented to be transverse to the forward-facing panel 114, with the flange 112 generally extending in the vehicle longitudinal direction and the forward-facing panel 114 generally extending in the vehicle vertical direction.

As shown in FIG. 2, the vehicle panel 110 is positioned above the bumper 120 in the vehicle vertical direction such that the vehicle panel 110 and the bumper 120 define a gap 10 positioned between a top surface 122 of the bumper 120 and the vehicle panel 110 in the vehicle vertical direction.

The vehicle 100 includes a seal member 140 that is coupled to at least one of the vehicle panel 110 and the bumper 120. In the embodiment depicted in FIG. 2, the seal member 140 is coupled to the vehicle panel 110 and extends between the vehicle panel 110 and the bumper 120 in the vehicle vertical direction, such that the seal member 140 extends across the gap 10. The seal member 140 may be formed from compliant material, such as a plastic, a rubber, a composite, or the like, and may be formed by any suitable process, including extrusion, molding, or the like. The seal member 140 is compressible, such that the seal member 140 may be compressed between the vehicle panel 110 and the top surface 122 of the bumper 120. The seal member 140 may expand or compress to extend across the gap 10 in the vehicle vertical direction, as will be described in greater detail herein.

The seal member 140 includes a seal portion 142 that extends downward from the vehicle panel 110 in the vehicle vertical direction. The seal portion 142 extends at least partially across the gap 10 in the vehicle vertical direction. In some embodiments, the seal portion 142 may extend fully across the gap 10 in the vehicle vertical direction, spanning between the vehicle panel 110 and the bumper 120. The seal portion 142 may generally extend in the vehicle vertical direction and may assist in blocking air flow through the gap 10 during vehicle operation.

The seal member 140 further includes a bulb portion 144 that is spaced apart from the seal portion 142 in the vehicle longitudinal direction. In the embodiment depicted in FIG. 2, the seal portion 142 is positioned forward of the bulb portion 144 in the vehicle longitudinal direction. Alternatively, the seal portion 142 may be positioned rearward of the bulb portion 144 in the vehicle longitudinal direction. The bulb portion 144 includes a bulb wall 146 that defines a cavity 148 positioned within the bulb wall 146. In embodiments, the bulb wall 146 includes a generally circular shape, however, it should be understood that the bulb wall 146 may include any suitable shape that extends between the vehicle panel 110 and the bumper 120. The cavity 148 may include a similar shape as the bulb wall 146. For example, the cavity may include a generally circular shape or any suitable shape defined by the bulb wall 146. When the gap 10 has the nominal height 12, the bulb portion 144 has a nominal height 20, as depicted in FIG. 2.

Figure 3A:
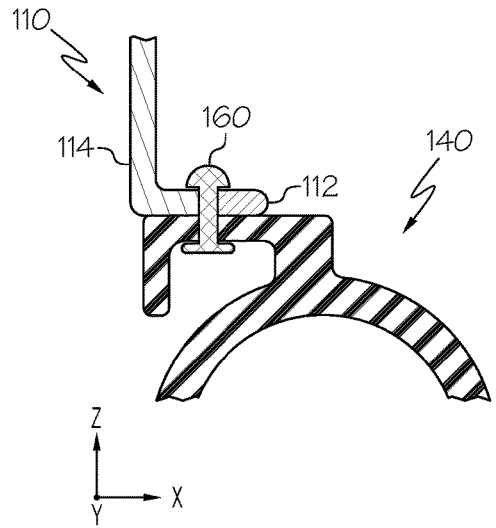
FIG. 3A schematically depicts a cross-section of the seal member of FIG. 2 coupled to the vehicle panel of FIG. 2 with a fastener according to one or more embodiments shown and described herein.

Referring to FIGS. 3A-3D, various methods for fastening the seal member 140 to the vehicle panel 110 are schematically depicted. Referring to FIG. 3A, in embodiments, the seal member 140 is coupled to the flange 112 and/or the forward-facing panel 114 through one or more fasteners 160. The seal member 140 may alternatively or additionally be coupled to the forward-facing panel 114 through one or more fasteners 160.

Figure 3B:
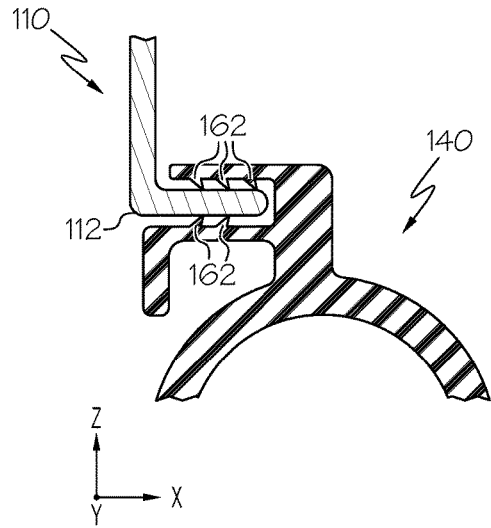
FIG. 3B schematically depicts a cross-section of the seal member of FIG. 2 coupled to the vehicle panel of FIG. 2 with teeth according to one or more embodiments shown and described herein.
Figure 3C:
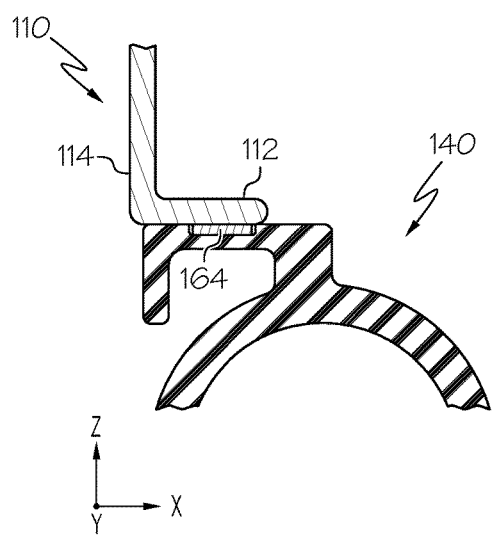
FIG. 3C schematically depicts a cross-section of the seal member of FIG. 2 coupled a flange of the vehicle panel of FIG. 2 with an adhesive according to one or more embodiments shown and described herein.
Figure 3D:
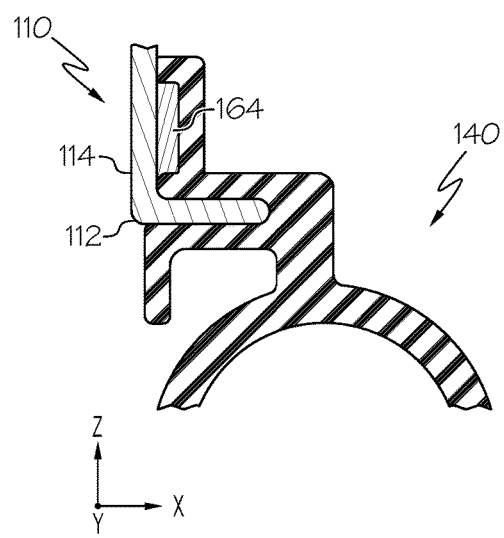
FIG. 3D schematically depicts a cross-section of the seal member of FIG. 2 coupled to a forward-facing panel of the vehicle panel with an adhesive according to one or more embodiments shown and described herein.

Referring to FIG. 3B, the seal member 140 may include one or more teeth 162 that contact and engage the flange 112 and may retain the position of the seal member 140 with respect to the flange 112. Referring to FIGS. 3C and 3D collectively, the seal member 140 may be coupled to the vehicle panel 110 through an adhesive 164, such as an adhesive tape, a glue, a structural adhesive, or the like. The seal member 140 may be coupled to the flange 112 through the adhesive 164, as shown in FIG. 3C, and the seal member 140 may alternatively or additionally be coupled to the forward-facing panel 114 through the adhesive 164, as shown in FIG. 3D. While the embodiments shown herein depict the seal member 140 as being coupled to the vehicle panel 110 and extending downward toward the bumper 120, it should be understood that the seal member 140 may alternatively be coupled to the bumper 120 and extend upward toward the vehicle panel 110 in the vehicle vertical direction.

Referring again to FIG. 2, the gap 10 between the vehicle panel 110 and the bumper 120 may vary. In particular, the nominal height 12 of the gap 10 evaluated in the vehicle vertical direction may vary depending on various factors, such as manufacturing tolerances, which may affect the distance between the vehicle panel 110 and the bumper 120 in the vehicle vertical direction. Additionally, during vehicle operation, the height of the gap 10 evaluated in the vehicle vertical direction may change as the vehicle 100 traverses uneven terrain. In particular, the vehicle frame may move with respect to the vehicle body, which may result in the bumper 120 moving with respect to the vehicle panel 110 in the vehicle vertical direction. As the height of the gap 10 varies, the seal member 140 may expand or compress such that the seal member 140 extends across the gap 10.

Figure 4A:
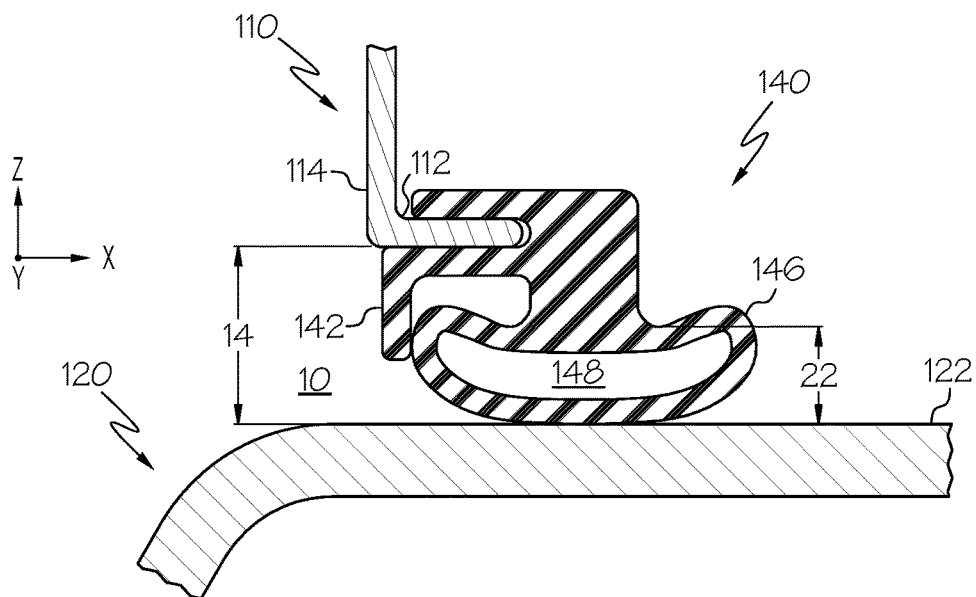
FIG. 4A schematically depicts a cross-section of the vehicle panel, the bumper assembly, and the seal member of FIG. 2 in a compressed position according to one or more embodiments shown and described herein.

Referring to FIG. 4A, the seal member 140 is compressed to a first dynamic height 14 that is less than the nominal height 12 of the gap 10 (FIG. 2). The seal member 140 is compressed as the bumper 120 moves upward toward the vehicle panel 110, such as when the vehicle moves over uneven terrain. As the bumper 120 and the vehicle panel 110 move toward one another in the vehicle vertical direction, the bulb portion 144 elastically deforms to accommodate the first dynamic height 14 of the gap 10. When the seal member 140 is compressed, the height 22 of the bulb portion 144 becomes less than the nominal height 20 of the bulb portion 144 in FIG. 2. The seal portion 142 may maintain its shape while the bulb portion 144 is compressed. When the seal member 140 is compressed, the shape of the cavity 148 also changes. For example, the shape of the cavity 148 changes from an oval to a half circle or a crescent shape.

Figure 4B:
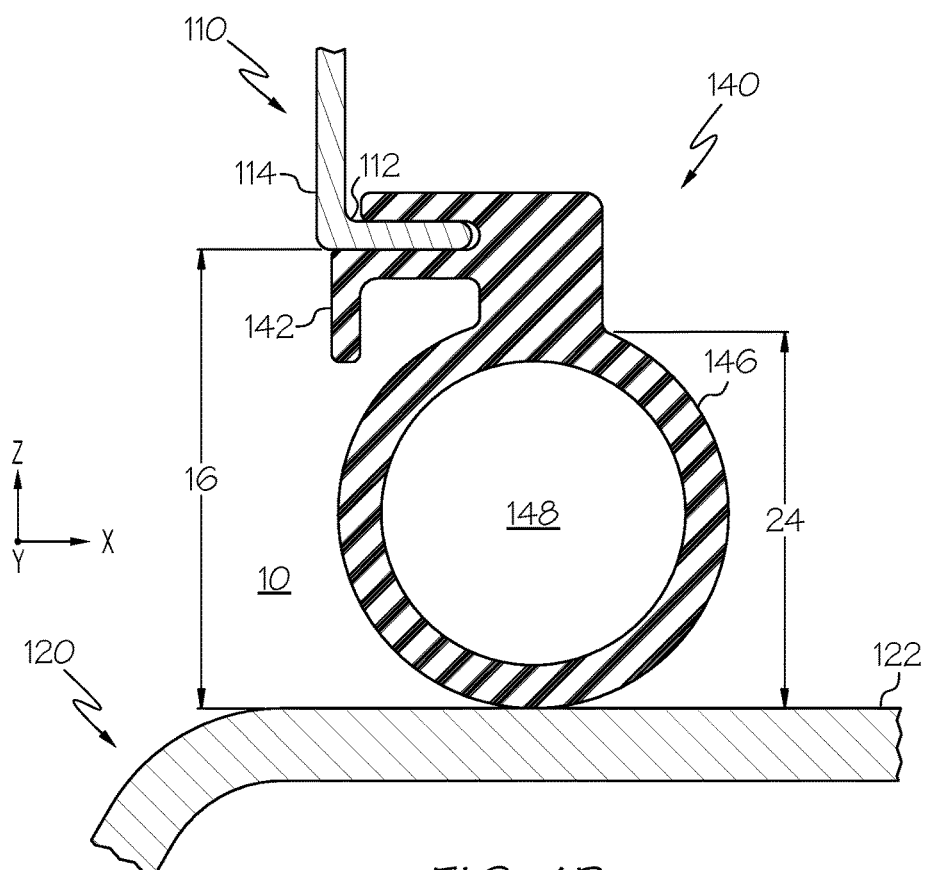
FIG. 4B schematically depicts a cross-section of the vehicle panel, the bumper assembly, and the seal member of FIG. 2 in an extended position according to one or more embodiments shown and described herein.

Referring to FIG. 4B, the seal member 140 is expanded to a second dynamic height 16 that is greater than the nominal height 12 of the gap 10 (FIG. 2). The seal member 140 is expanded as the bumper 120 moves downward away from the vehicle panel 110, such as when the vehicle moves over uneven terrain. As the bumper 120 and the vehicle panel 110 move away from one another in the vehicle vertical direction, the bulb portion 144 elastically deforms to accommodate the second dynamic height 16 of the gap 10. When the seal member 140 is expanded, the height 24 of the bulb portion 144 becomes greater than the nominal height 20 of the bulb portion 144 in FIG. 2. The seal portion 142 may maintain its shape while the bulb portion 144 is expanded. When the seal member 140 is expanded, the shape of the cavity 148 also changes. For example, the shape of the cavity 148 changes from an oval to a circle or a differently-shaped oval. In some embodiments, the bottom of the bulb portion 144 in a vehicle vertical direction may be attached to the top surface 122 of the bumper 120 by various methods as described above with reference to FIGS. 3A-3D in order to prevent any gap between the bulb portion 144 and the bumper 120.

As described above, the seal member may extend across a gap between a vehicle bumper and a vehicle panel. The seal member may compress or expand depending on a varying gap between the vehicle bumper and the vehicle panel such that it may reduce airflow through the gap, and thus, reduce air drag on the vehicle, thereby increasing overall vehicle efficiency. Specifically, with the seal member filling the gap between the vehicle bumper and the vehicle panel, a drag force which drags a vehicle in an opposite direction to the vehicle's driving direction is reduced, and thereby increasing fuel economy of the vehicle.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

The invention claimed is:

1. A vehicle front fascia comprising:
  a vehicle panel;
  a bumper assembly positioned below the vehicle panel in a vehicle vertical direction; and
  a seal member coupled to the vehicle panel and extending between the vehicle panel and the bumper assembly in the vehicle vertical direction, the seal member comprising:
    a seal portion that extends downward from the vehicle panel in the vehicle vertical direction; and
    a bulb portion spaced apart from the seal portion in a vehicle longitudinal direction, the bulb portion comprising a bulb wall that defines a cavity within the bulb wall.

2. The vehicle front fascia of claim 1, wherein the vehicle panel comprises a forward-facing panel that extends in the vehicle vertical direction and a flange that extends rearward from the forward-facing panel in the vehicle longitudinal direction.

3. The vehicle front fascia of claim 2, wherein the seal member is coupled to the flange of the vehicle panel.

4. The vehicle front fascia of claim 2, wherein the seal member is coupled to the forward-facing panel of the vehicle panel.

5. The vehicle front fascia of claim 1, wherein the bulb portion is positioned rearward of the seal portion in the vehicle longitudinal direction.

6. The vehicle front fascia of claim 1, wherein the bulb portion contacts the bumper assembly.

7. A vehicle comprising;
  a vehicle panel;
  a bumper assembly positioned below the vehicle panel in a vehicle vertical direction, wherein the vehicle panel and the bumper assembly define a gap positioned between the vehicle panel and the bumper assembly in the vehicle vertical direction, and wherein the vehicle panel and the bumper assembly are repositionable between a nominal position, in which the gap comprises a nominal gap height evaluated between the vehicle panel and the bumper assembly in the vehicle vertical direction, and a dynamic position, in which the gap comprises a dynamic gap height evaluated between the vehicle panel and the bumper assembly in the vehicle vertical direction, wherein the dynamic gap height is different from the nominal gap height; and
  a seal member coupled to the vehicle panel and extending between the vehicle panel and the bumper assembly in the vehicle vertical direction, the seal member comprising:
    a seal portion that extends downward from the vehicle panel in the vehicle vertical direction; and
    a bulb portion spaced apart from the seal portion in a vehicle longitudinal direction, wherein the bulb portion contacts the bumper assembly when the bumper assembly is in the nominal position and the bulb portion contacts the bumper assembly when the bumper assembly is in the dynamic position.

8. The vehicle of claim 7, wherein the dynamic gap height is greater than the nominal gap height.

9. The vehicle of claim 7, wherein the dynamic gap height is less than the nominal gap height.

10. The vehicle of claim 7, wherein the bulb portion contacts the seal portion when the bumper assembly is in the dynamic position.

11. The vehicle of claim 7, wherein the bulb portion is spaced apart from the seal portion when the bumper assembly is in the nominal position.

12. The vehicle of claim 7, wherein the vehicle panel comprises a forward-facing panel that extends in the vehicle vertical direction and a flange that extends rearward from the forward-facing panel in the vehicle longitudinal direction.

13. The vehicle of claim 12, wherein the seal member is coupled to the flange of the vehicle panel.

14. The vehicle of claim 12, wherein the seal member is coupled to the forward-facing panel of the vehicle panel.

15. A vehicle comprising:
   a vehicle panel;
   a bumper assembly positioned below the vehicle panel in a vehicle vertical direction; and
   a seal member coupled to the vehicle panel and extending between the vehicle panel and the bumper assembly in the vehicle vertical direction, the seal member comprising:
      a seal portion that extends downward from the vehicle panel in the vehicle vertical direction; and
      a bulb portion spaced apart from the seal portion in a vehicle longitudinal direction, wherein the bulb portion is compressible between a nominal position, in which the bulb portion has a nominal height evaluated in the vehicle vertical direction, and a compressed position, in which the bulb portion has a compressed height evaluated in the vehicle vertical direction, wherein the compressed height is less than the nominal height.

16. The vehicle of claim 15, wherein the bulb portion contacts the bumper assembly in the nominal position and the bulb portion contacts the bumper assembly in the compressed position.

17. The vehicle of claim 15, wherein the bulb portion contacts the seal portion in the compressed position.

18. The vehicle of claim 15, wherein the bulb portion is expandable between the nominal position and an extended position, in which the bulb portion has an extended height evaluated in the vehicle vertical direction that is greater than the nominal height.

19. The vehicle of claim 15, wherein the vehicle panel comprises a forward-facing panel that extends in the vehicle vertical direction and a flange that extends rearward from the forward-facing panel in the vehicle longitudinal direction.

20. The vehicle of claim 19, wherein the seal member is coupled to the flange of the vehicle panel.

* * * * *